[11] 3,557,369

[72] Inventors Eugene S. Rubin
Waban;
William J. Parkin, Wayland, Mass.
[21] Appl. No. 587,375
[22] Filed Oct. 12, 1966
[45] Patented Jan. 19, 1971
[73] Assignee the United States of America as represented by the Secretary of the Navy, by mesne assignment

[54] RADIANT ENERGY DETECTING SYSTEM
5 Claims, 7 Drawing Figs.
[52] U.S. Cl. ............................................. 250/83.3, 250/203
[51] Int. Cl. .............................................. H01j 39/00
[50] Field of Search ................................. 250/203, 83.3IR, 216, 227, 1M; 88/1M

[56] References Cited
UNITED STATES PATENTS
2,700,318  1/1955  Snyder ......................... 250/203X
3,244,894  4/1966  Steele et al. .................. 250/227
3,143,650  8/1964  Mizen ........................... 250/83.3

Primary Examiner—Rodney D. Bennett, Jr.
Assistant Examiner—William T. Rifkin
Attorneys—R. I. Tompkins and L. I. Shrago ABSTRACT: An infrared detection system for discriminating between point sources and extended sources of infrared radiation is disclosed wherein a pair of detectors are provided with control electrodes which are energized with quadraturely phased driving voltages to provide information on the coordinate position of any radiant energy image falling on the detectors. In front of each detector is a stationary reticle having a checkerboard pattern of areas opaque and transparent to infrared radiation. One checkerboard is the reverse of the other. The outputs of the detectors are combined in a differential amplifier. When an image from an extended radiation source is focused on the reticles, it covers several of the individual squares of the checkerboard design and similar signals are produced which cancel out in the amplifier. A point source target, in contradistinction, passes through only one of the reticles and, consequently, its signal does not cancel in the amplifier.

PATENTED JAN 19 1971

*INVENTOR.*
Eugene S. Rubin
William J. Parkin

BY

INVENTOR.
Eugene S. Rubin
BY William J. Parkin

RADIANT ENERGY DETECTING SYSTEM

The present invention relates generally to apparatus for detecting radiant energy, and more particularly, to an infrared detecting system which can recognize point source targets in the presence of extended radiation such as that produced by cloud reflection.

Infrared detecting systems designed to acquire and track targets in space must be able to distinguish between these targets and other sources of radiation in the field of view that may be produced by natural phenomena. One method of accomplishing this is to employ a very small field of view and to scan this field of view in some systematic manner over a comparatively large total field in which the target may be located. Because this small field of view will completely enclose a point target and only cover, for example, part of a cloud, signals of different wave form will appear in the output of the detector when these sources are examined during the scanning cycle. This technique, however, is usually unsatisfactory for the scanning speed required to cover a significant field is generally too high to permit the radiation detector to respond properly in the short time during which it is irradiated by target energy. Also, the high scanning speed required by this mode of operation necessitates complicated mechanical driving equipment.

To increase the instantaneous field of view and still discriminate against certain types of extended targets, some of the systems employ a filter or reticle which has transparent and opaque areas calculated to favor the transmission therethrough of finite images. When this type of reticle scans a scene containing a point source target, substantially all of the target energy passes through a transparent area and reaches the detector. The electrical output signal of the detector thus has a peaked wave form. When it scans a cloud, a different waveform is produced which has a gradual slope and a broadened peak. Electrical filters, therefore, may be used to distinguish between these radiation sources. However, when there is a target and a cloud both present, this type of system cannot sort out the target from the background or give tracking information on its precise location.

The present invention accomplishes the above result, as will be seen, by utilizing as the infrared sensing element of the detector a geometric area of photoconductive material, such as, for example, lead sulfide. This area may be square shaped. Connected to each corner is an electrode, and quadraturely phased driving voltages are applied to each diagonal pair of electrodes. Positioned in the center of the square is a fifth electrode which serves as the output terminal for the detector.

As pointed out in application, Ser. No. 253,503, filed Jan. 23, 1963, this device, which has been given the name, "Rotating Field Detector," can provide information on the coordinate or X, Y position of any radiant energy image falling on the photoconductive material. If the device is orientated such that one of the diagonals of the square lies along a vertical direction, then this diagonal may be considered the Y coordinate of the reference system and the other diagonal the X coordinate. If the output signal taken from the center electrode is fed to a pair of phase-sensitive detectors which have as their other inputs the quadrature voltages driving the diagonal electrodes, then the output of these detectors will yield the X and Y coordinates of the target image. Hence, this detector and its control circuit can give tracking information on any target in the field of view. Also, more importantly, it accomplishes this without the rotating reticle needed in prior art systems. Also, the chopping frequency is not limited by the detector time constant or by mechanical restrictions.

To cancel out extended background targets, the optical system of the present invention develops two identical images of the field of view, and these images are projected or otherwise focused on two checkerboard reticles. These reticles are of a complementary design, that is, where each of the squares of one checkerboard is transparent, the other is opaque. Behind each reticle is a rotating field detector. Because of a reverse reticle coding, a point target that falls completely on a transparent square of one reticle must, perforce, fall on an opaque square of the other. Consequently, the radiant energy from such a target reaches one detector and not the other. However, when a cloud is in the field of view, because of its larger and irregular shape, its image will cover a plurality of the individual squares of each reticle. Since half of these squares may be expected to be translucent, approximately half of the total radiated energy from the cloud will pass through each of the reticles and reach its companion detector. If the outputs of the detectors are therefore fed to a differential amplifier wherein these signals are effectively subtracted, the signal representing this cloud can be canceled out of the overall detecting system.

If a point source is present along with the cloud, then this condition may be recognized by analyzing the output of the differential amplifier. Since the photoconductive detector is an integrating device that is responsive to the total power falling on it, the output of the differential amplifier will show a target signal whenever the energy reaching the detector from a point target is a predetermined amount greater than that reaching it from an equivalent area of a cloud. Since this is usually the case, that detector of the pair which is illuminated by the point target will have the greater output, and this will be evident in the output of the differential amplifier.

It is accordingly a primary object of the present invention to provide an infrared detecting system which has a provision for discriminating against extended background signals.

Another object of the present invention is to provide an infrared detecting system which gives tracking information on a point target without recourse to a rotating reticle.

A still further object of the present invention is to provide an infrared detecting system which can recognize point source targets in its field of view and give tracking data on this target.

A yet still further object of the present invention is to provide an infrared detecting system which discriminates against extended background radiation sources by utilizing a pair of stationary reticles having complementary codings.

Other objects, advantages and novel features of the invention will become apparent from the following detailed description of the invention when considered in conjunction with the accompanying drawings wherein.

Figure 1:
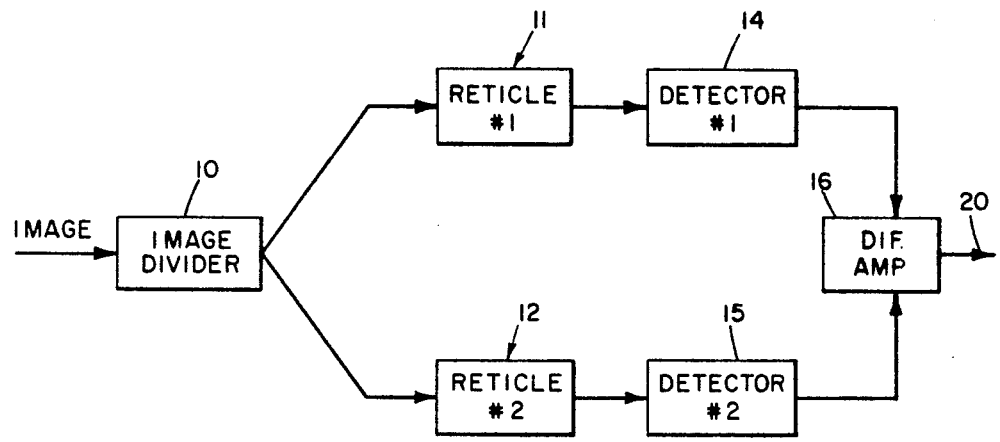
FIG. 1 is a block diagram showing the general arrangements of the detecting system.

Referring now to FIG. 1 of the drawings, which is a block diagram illustrating the general nature of the invention, it will be seen that the detecting system includes suitable optics, not shown, for viewing a predetermined area of space and for forming by means of image divider 10 a pair of identical images of the scene so examined. One of the images so derived is focused on a first stationary reticle 11, while the other is focused on a second stationary reticle 12. As mentioned hereinbefore and as perhaps best seen in FIGS. 2 and 3, these reticles have complementary checkerboard designs. Thus, for example, where square 13 of reticle 2 is opaque to infrared radiation, corresponding square 13A of reticle 12 is transparent to this radiation. This reverse relationship exists over the complete area of the reticles. Behind each reticle is an infrared detector, 14 and 15, of the rotating field-type mentioned hereinbefore. Each of these detectors has an active surface substantially the same size as its companion reticle. The output from each detector is fed to a differential amplifier 16.

Figure 3:
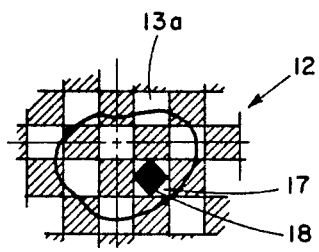
FIG. 3 shows a corresponding portion of the other reticle in the system of FIG. 1.

From what has been already mentioned hereinbefore, it will be appreciated that any point source infrared target in the field of view of the optical apparatus, such as the diamond-shaped representation 17 in FIG. 3, will, if it falls on a transparent square, such as 18 of reticle 12, fall on an opaque square 19 of reticle 11. In the case shown, the radiant energy emanating from this target, therefore, will reach detector 15 and not detector 14. Consequently, since the inputs to differential amplifiers 16 are not equal, an output signal will appear in its output circuit 20 denoting the presence within the viewing area of a finite target. This target will continue to produce an output signal as it moves in space or its image travels across the face of each reticle. When it moves to a location where it covers equal portions of an adjacent and opaque square, the output signal will accordingly dip, but this will be a momentary effect.

Figure 2:
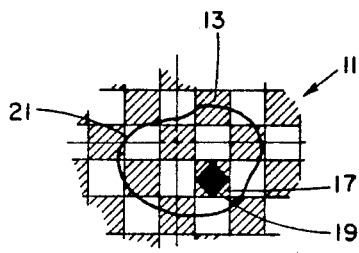
FIG. 2 shows a portion of one of the reticles in the system of FIG. 1.

If a cloud, such as that represented by the irregular shape 21 in FIG. 2, falls on reticles 11 and 12, its image will be large enough, as contrasted to the point source target, to cover a multiplicity of individual squares of these reticles. In the optimum case, the image will cover equal opaque and transparent areas of each reticle. In this "best situation" detectors 14 and 15 will develop similar output signals, and these signals, when applied to differential amplifier 16, will cancel out. Consequently, no signal will be observed in the output circuit 20 of this amplifier from this source of radiation. In the event that cloud image 21 does not cover equal, opaque and transparent areas, the complete signal cancellation just mentioned will not occur. Nevertheless, there still will be an appreciable reduction in the level of the output signal present in circuit 20.

In the event that both a point target and a cloud are simultaneously present in the field of view, which is the case illustrated in FIG. 3, then detector 15 will develop a greater signal than its companion detector 14, and the inequality of inputs to differential amplifier 16 will result in a definite output signal in circuit 20. This signal will show up during that part of the cycle of the rotating field detector which corresponds to the scanning of the point target. Again, the reason for this is that each detector is an integrating device whose signal corresponds to the total amount of power falling on its active surface. Therefore, since the signal emanating from the point target will usually be of greater intensity than that from a finite area of a cloud, the detector illuminated by the point target will show the greater output signal.

Figure 4:
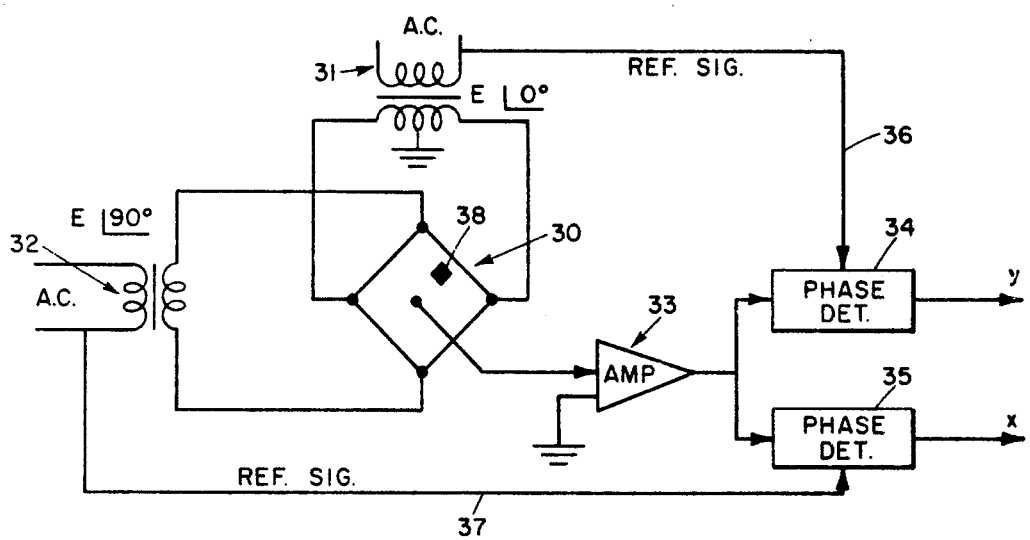
FIG. 4 shows a control circuit for producing tracking data on an infrared target in the field of view of the detector.

FIG. 4 shows a control circuit for the rotating field detector. In this case, radiation detector 30 is of square shape and electrodes are fastened to each corner thereof and to its center. A pair of quadraturely phased, driving voltages from sources 31 and 32 are applied across each diagonal pair of electrodes, and the output at the center electrode is fed to a suitable AC amplifier 33. The output from this amplifier is split and sent to a pair of phase-sensitive detectors 34 and 35 which have as their other inputs reference signals 36 and 37 taken from driving sources 31 and 32. The output of these phase detectors are the X and Y components of the target illuminating the detector. More specifically, the output of each phase detector represents the displacement of the target signal from the perpendicular bisect of the line connecting the two electrodes which are driven by the same signal as that serving as one of the inputs to this phase-sensitive detector. Thus, if a target such as that represented by spot 38 in FIG. 4 illuminates detector 30, the output of phase detector 35 will indicate its displacement from the vertical axis, and the output from phase detector 34 will indicate its displacement from the horizontal axis. In the case shown, these X and Y components are positive and the target is found in the upper-right quadrant of the detector. This system, therefore, as alluded to hereinbefore, yields tracking data on any target detected by the system. Moreover, the quadraturely phased driving voltages duplicate the performance of the usual rotating reticle required in prior art systems. The importance of this provision is adequately set forth in the above copending application.

The system of FIG. 1, unfortunately, is ambiguous because of the differential amplifier. In other words, if the target falls on a transparent square above the X axis on reticle 11, a positive voltage is developed by detector 14, and a similar positive output signal appears in the output circuit of differential amplifier 16. However, if the same target image falls on a transparent square below the X axis on reticle 12, a negative voltage is developed by detector 15, but when this signal is processed in differential amplifier 16, a positive output signal again appears in output circuit 20. Consequently, the system as shown cannot recognize whether the target is above or below the X axis.

Figure 5:
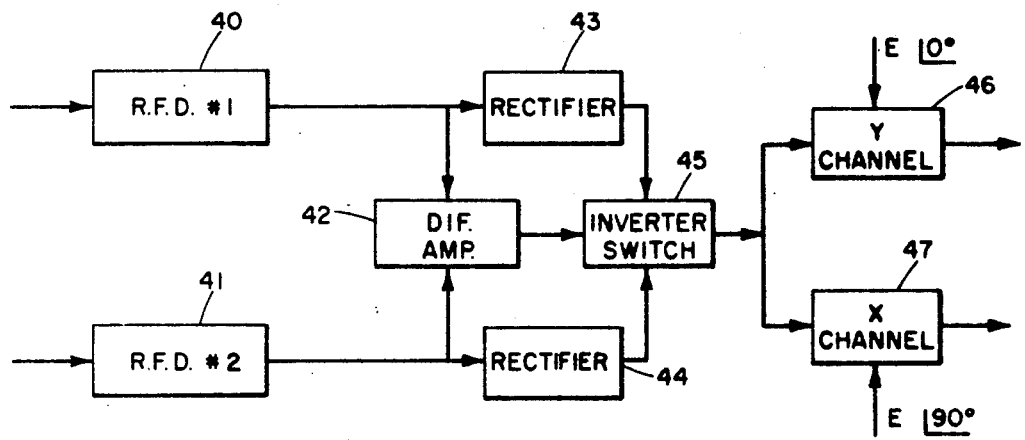
FIG. 5 shows a modification which eliminates the ambiguity problem present in the basic system of FIG. 1.

The above uncertainty can be resolved by the system of FIG. 5 wherein the output from the detectors 40 and 41 are fed to differential amplifier 42 and to rectifiers 43 and 44, respectively. These rectifiers control the operation of an inverter switch 45 which has the output from amplifier 42 coupled to it. The output from switch 45 is split and fed to phase-sensitive detectors 46 and 47.

Inverter switch 45 has two positions. Whenever the output from rectifier 43 is greater than that from 44, switch 45 moves to its first position and, in this position, the signal from amplifier 42 passes through it without any phase shift. Whenever the output from rectifier 44 is greater than that from 43, switch 45 moves to an alternate position and the signal from amplifier 42 experiences a phase reversal as it passes through it. Therefore, when the point target falls on a transparent square of reticle 11 which is above the X axis, the proper positive signal is still available for use in the phase-sensitive detectors. And, when the target signal falls on a transparent area of reticle 12 which is below the axis, the output signal from differential amplifier 42 experiences a phase reversal and the proper negative signal is available for use in these same phase detectors. The phase shift imparted by the inverter switch in the latter case, it will be appreciated, thus compensates for the action of the differential amplifier which is the source of the ambiguity in the basic circuit of FIG. 1.

Figure 6:
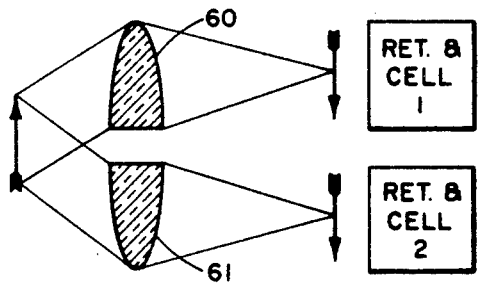
FIG. 6 shows one simple optical arrangement for dividing the image.

Any conventional optical system may be employed to provide the two identical images of the common field of view for focusing on the two reticles. FIG. 6 illustrates one simple arrangement using a split lens wherein two complementary lenses, segments 60 and 61, cut from a single lens serves to provide the necessary image splitting. This method is particularly convenient since both lens segments possess the same focal length. Also, the two image planes are adjacent and this simplifies the alignment of the reticles and detectors. In one particular embodiment of the invention, the lens used was a cemented achromat with a 90 mm. focal length and a 56 mm. diameter. The lens segments were separated by approximately 0.85 inches which produced a corresponding separation of the images.

Figure 7:
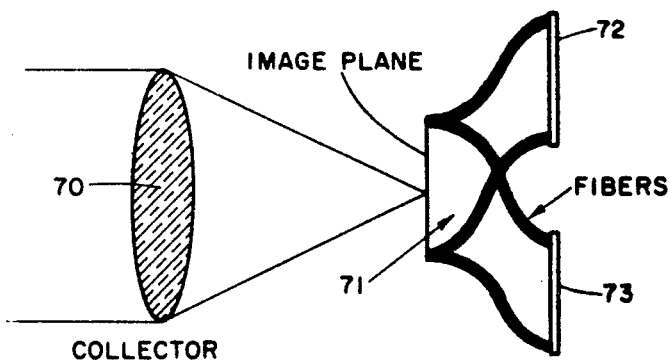
FIG. 7 shows an arrangement wherein a fiber optic bundle both splits the image and acts as the complementary reticles.

In FIG. 7 there is shown an alternative arrangement wherein the image division and the reticle functions are performed by a fiber optical system. In this case, the image is focused by lens 70 on one end of a fiber bundle 71. The individual fibers in this end of the bundle are arranged in a checkerboard pattern and the ends of those fibers corresponding to every alternate square are placed on one detector 72, while the ends of these fibers corresponding to the remaining squares are placed on the second detector 73. This system possesses several advantages. First, the various elements can be potted into one solid package thus giving ruggedness and a high degree of dimensional stability. In addition, the fiber bundle can be made into a nonplane imaging surface, thereby giving an improved image and allowing larger fields of view.

In one preferred embodiment of the invention, each square segment of the checkerboard reticle was .01 inches by .01 inches. The reticles were made by depositing Inconel on a 0.032 inch thick quartz substrate. It would be pointed out in connection with the reticle design that the segments, instead of being arranged in horizontal rows and vertical columns, may be located along the radii of a circle with those at the same distance from the center having the same area and with this area decreasing towards the center and increasing towards the circumference. Likewise, the infrared detectors need not have a rectangular configuration but may, for example, be circular with the electrodes at appropriate diametrical points.

Obviously many modifications and variations of the present invention are possible in the light of the above teachings. It is therefore to be understood that within the scope of the appended claims the invention may be practiced otherwise than as specifically described.

We claim:

1. In an infrared detecting system for discriminating between point sources and extended sources of infrared radiation, the combination of:
   a pair of stationary reticles, each of said reticles having a geometric pattern of areas that are alternately opaque and transparent to infrared radiation with the pattern of one reticle being the reverse of the other reticle so that wherever one of said reticles has an opaque area, the other has a transparent area and vice versa;
   said pattern of opaque and transparent areas corresponding to a checkerboard design, with the size of each individual square thereof being such as to permit all of the infrared energy from a point source to be focused on one of the individual transparent areas;
   an infrared detector positioned behind each reticle and adapted to be illuminated by infrared radiation passing through the transparent areas of the reticle in front of it;
   optical means for viewing an area of space and for focusing an image of the area of space so viewed on each of said reticles; and
   means for differentially combining the electrical signals developed by said detectors thereby to produce an output signal.

2. In an arrangement as defined in claim 1 wherein each of said infrared detectors includes:
   a surface of photoresponsive material;
   a pair of vertically spaced electrodes attached to said surface;
   a pair of horizontally spaced electrodes also attached to said surface; and
   an output electrode attached to said surface at a point midway between said pairs of electrodes.

3. In an arrangement as defined in claim 2, means for applying quadraturely phased driving voltages to said vertical and horizontal electrodes, thereby to produce a so-called "rotating field" effect.

4. In an arrangement as defined in claim 3, means for rectifying the electrical signals developed by said detectors; and means responsive to the relative amplitudes of said rectified signals for subjecting said output signal to either a 0° or 180° phase shift, depending upon which of said rectified signals has the greater amplitude.

5. In an arrangement as defined in claim 1 wherein said individual transparent areas and said individual opaque areas are of equal size.